Jan. 26, 1965  N. A. KEITH  3,166,831
METHOD OF MAKING COMPOSITE ELEMENTS
Filed Sept. 4, 1962

INVENTOR.
NORVAL A. KEITH
BY
Henry Powers
ATTORNEY

United States Patent Office 3,166,831
Patented Jan. 26, 1965

3,166,831
METHOD OF MAKING COMPOSITE ELEMENTS
Norval A. Keith, East Alton, Ill., assignor to Olin Mathieson Chemical Corporation, a corporation of Virginia
Filed Sept. 4, 1962, Ser. No. 221,118
8 Claims. (Cl. 29—155)

This invention relates to composite structures and more particularly to a method for providing reinforced metallic structures.

It is an object of this invention to provide a novel method of reinforcing structural members.

It is another object of this invention to provide a novel method of forming and reinforcing composite structural members.

A further object of this invention is to provide a method of making a structural unit having a high strength to weight ratio.

A still further object of this invention is to provide a structural unit having a method of making a high flexural strength, resistance to buckling and indentation, and the like.

Other objects and advantages of this invention will become more apparent from the following description and drawings in which.

Figure 1:
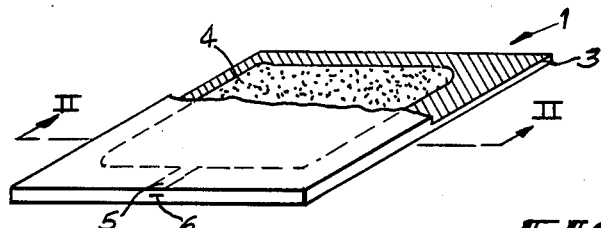
FIGURE 1 is a perspective view of a partially laminated sheet of metal employed for illustrating one embodiment of this invention.
Figure 2:
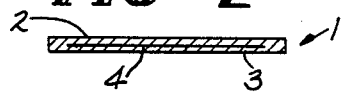
FIGURE 2 is a view taken along lines II—II of FIGURE 1.
Figure 3:
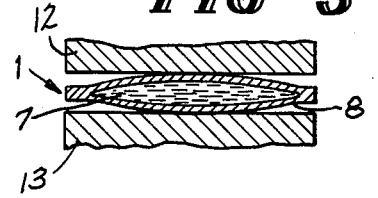
FIGURE 3 is an elevational view in cross-section illustrating a step in the processing of the metal sheet of FIGURE 1 in accordance with one embodiment of this invention.
Figure 5:
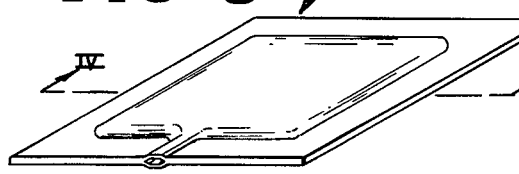
FIGURE 5 is a perspective view of a composite structural unit obtained by the processing of the metal sheet of FIGURE 1 in accordance with one embodiment of this invention.

Generally speaking this invention comprehends the fabrication of a composite structural unit from a sheet metal blank having a partially laminated interior adapted for distention with fluid pressures. Preferably such a blank is formed of superimposed sheets of ductile metal whereinbetween a marginal portion of their confronting surfaces adjacent the periphery of the sheets is joined, as by pressure welding, together about an unjoined interior portion adapted to receive a fluid under pressure, as for example, by a suitable inlet means extending from the interior to the periphery of the sheets. The unjoined interior portion of such a blank in a softened condition, as by annealing, is then expanded by injecting therein a liquid foamable plastic forming reaction mixture, which forms a solid foamed plastic product, with said reaction mixture being provided in a quantity which generates, in situ, sufficient volume of foamed plastic product the growth of which forces and deforms the complementary portions of the joined sheets, opposite the unjoined interior portion, away from each other in the desired spaced relationship between them. Various foam systems may be employed, either of the thermosetting or thermoplastic type well known in the art, for example, such foaming system may comprise foamed-inplace polyurethanes whose reactants may be employed in the liquid state and injected into the panel through a suitable opening, wherein, upon foaming, these reaction mixtures generate sufficient pressure to deform the metal, of the unified sheets, defining and disposed opposite the unjoined interior portion, into a desired spaced relationship between them with the foamed plastic product retained and cured in place. Such foamed-in-place polyurethanes may be a one shot, quasi, and prepolymer system as these terms are commonly used in the art. For example, such polyurethane reaction mixtures may be comprised of the two solution type wherein one of the solutions may consist of an isocyanate prepolymer and the other solution may be comprised of cross-linking agents such as polyols, blowing agents such as chlorofluoronated hydrocarbons, water or carbon dioxide and a catalyst. Such polyurethane foaming systems are fully illustrated and disclosed in U.S. Letters Patent No. 2,866,774.

In application of the two-component reaction mixtures, the prepolymer solution may be injected into the internal unjoined portion, defined between the unified sheets, in an amount sufficient to force the complementary portions, of the unified sheets, defining this unjoined portion, away from each other into an intermediate first spaced relationship followed by introducing the second of the solutions and initiating the reaction of the mixture to form a foam plastic product with accompanying generation of pressure sufficient to complete the development of the desired cross-sectional configuration of the resultant composite structural unit, that is, that the volume of the product of the reaction further forces and deforms the complementary portions, of the unified sheets, defining the unjoined interior portion therein, further away from each other an additional amount representing the ultimate spaced relationship desired between them. It is to be understood, that, in an alternate manner, such a two component system may be combined and then injected into the unjoined internal portion contained within the unified sheets.

Other foam systems, particularly those which result in a bond, between the foam and internal metal surfaces, can be used advantageously. For example, such systems may be thermosetting or thermoplastic foamable polymers of polyethylene, polystyrene, polyvinyl chloride, copolymers of acrylonitrile, phenolic resins, polyesters and the like. And, as indicated above, such foaming systems may be prepolymer and catalyst mixtures, or may be employed in conjunction with blowing agents well known in the art.

More specifically, by reference to the drawings, FIGURE 1 illustrates a pressure welded blank 1 obtained from a pair of component sheets 2 and 3 of a ductile metal which had been pressure welded together about a predetermined configuration or pattern of stop-weld material 4 disposed between the component sheets in a portion therebetween spaced from the peripheral edges. This pattern of stop-weld material is adapted for distention or inflation, to form a corresponding desired design, by means of a band of stop-weld material 5 extending to a peripheral edge where it is defined as lamination 6 so as to provide thereat a suitable inlet for injection of a suitable foamable plastic forming reaction mixture in accordance with this invention. As will be understood, this pattern of stop-weld material 4 corresponds to the area between the component sheets which remains unwelded and which corresponds to the aforementioned design. As illustrated in FIGURE 1, the area covered by the pattern of stop-weld material 4 defines the area which remains unwelded during the pressure welding operation whereas the areas devoid of stop-weld material define those areas which become unified or welded together during the welding operation. A more extended description of this process is found in U.S. Letters Patent No. 2,690,002. Although a specific pattern has been illustrated, as will be obvious, various designs are possible.

By way of example, a panel 1 having dimensions of 10 inches in width, 18 inches in length and 0.060 inch in thickness was fabricated by the unification of two component sheets 2 and 3 of 1100 aluminum alloy, designated in accordance with the Aluminum Association standard designations. In the fabrication of the panel, either component sheet 2 or component sheet 3 has applied to it the pattern 4 of stop-weld material corresponding to the desired design, the other component sheet is then superimposed on the first sheet so as to sandwich the pattern between them, and the pair of sheets are then suitably welded together either by cold rolling or preferably by hot rolling. In this example the pattern of stop-weld material covers substantially 71 percent of the original interface between component sheets 2 and 3; and in the resultant pressure welded blank, the complementary portions of original component sheets 2 and 3 which are disposed opposite the stop-weld pattern 4 will have individual thicknesses of .030 inch.

As will be understood the pattern of stop-weld material may be applied to component sheets in various ways, such as by spraying through a masking die, printing through a stencil or preferably through a silk screen in a manner well known in the art. As pointed out above, the pattern 4 of stop-weld material is adapted so as to provide in the pressure welded blank, either prior to or subsequent to its trimming, the inlet 6 for insertion of a suitable nozzle, not shown, through which the foamable plastic forming reaction mixture is to be injected, in accordance with this invention, into the unwelded portion of the blank resulting from the interpositioning of the stop-weld material between the adjacent surfaces of the superimposed sheets. Thereafter, a liquid foamable plastic forming reaction mixture 7 is then injected through inlet 6 into the unwelded portions within the panel or blank at a pressure having a magnitude sufficient to provide a preliminary expansion of the panel whereby the complementary unwelded portions become separated from each other to, in effect, form an intermediate or transitory chamber 8 containing the foam forming mixture 7. The complementary portions defining the unwelded interior portion of the panel are initially separated to a spacing sufficient to receive a quantity of the reaction mixture to provide a quantity of the foamed reaction product necessary to further deform the complementary portions, of the panel, into the final spacing desired in the configuration of the ultimate composite structural element. The reaction mixture is then expanded, in situ, within panel 1 wherein it generates sufficient foamed reaction product 9 to develop the desired configuration in the ultimate structure 10 which is characterized by a hollow interior 11 bulging out of the face of the blank to form the desired design corresponding to the pattern 4 of stop-weld material; and which hollow interior 11 is filled with foamed plastic 9 corresponding to the particular plastic foam reaction mixture utilized.

In the specific example referred to, the following formulation, which provided a foam plastic reinforced panel having a maximum thickness of 3 inches, was obtained by the combining of 100 grams of a prepolymer (representing 4.5 equivalents of toluene diisocyanate, 80 parts of the 2–4 isomer and 20 parts of the 2–6 isomer, and 1.0 equivalents of copropoxylated tetrol of an OH 435) with 77 grams of a copropoxylated tetrol of an OH 435, 0.4 gram of Dow Corning silicone copolymer, 5.0 grams of fluorocarbon 11 and 0.5 gram stannous octoate. It is to be understood that, as indicated above, other foamable plastic forming reaction mixtures may also be employed, however, as will be obvious, the quantiy of the specific reaction mixture utilized is necessarily dependent upon the type and/or combination of alloys employed, their thicknesses, the extent of the area between superposed sheets to be developed into a desired configuration, and dimensions of the resultant configuration developed in the ultimate composite structural element together with the desired control of the density of the foam with subsequent rigidity; and such quantity of the foam system selected can be readily determined by one skilled in the art.

Figure 4:
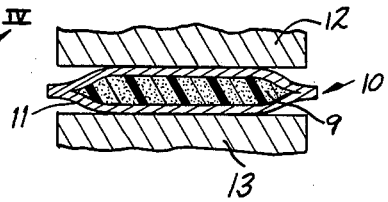
FIGURE 4 is an elevational view in cross-section illustrating a further processing of the metal sheet of FIGURE 1 in accordance with one embodiment of this invention, and to illustrate cross-section of the fabricated structure illustrated in FIGURE 5.

It is to be understood that the dilation of the blank can be accomplished either freely or under restraint. Where the blank is not under any restraint the expanded portions result in a rounded configuration. Preferably, where restraint is used, the blank is positioned, either prior to or during foaming, between a pair of rigid surfaces or platens 12 and 13 which are spaced a distance equal to the amount of dilation desired for the unwelded area or portion 4 of the blank. For example, the blank may be distended, during initial injection of the reaction mixture, against the rigid surfaces or platens 12 and 13, increasing the spacings of the platens 12 and 13, followed by reacting the reaction mixture to complete the development of a configuration desired for the unwelded portion 4 contained in the blank 1. As illustrated in FIGURE 4, this final development of the cross-section, upon foaming of the reaction mixture, causes the complementary portions of the unwelded area 4 to come in contact against the rigid surfaces or platens 12 and 13 so that the external surface of the blank is shaped to provide a flat-topped configuration to the distended portions as substantial amounts of the crest come in contact with the platens or surfaces. As a result, the panel 10 has complementary unwelded portions separated apart into a flat-topped configuration providing an internal hollow 11 filled with the foamed plastic 9. The fabrication of composite structural elements in accordance with this invention provides a very rigidized structure, having high resistance to indentation, increased flexural strength and a greater ratio of strength to weight adapting such elements for advantageous use in structural applications.

Figure 7:
FIGURE 7 is an elevational view in cross-section illustrating a further processing of the metal sheet of FIGURE 6.
Figure 6:
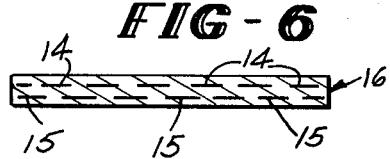
FIGURE 6 is an elevational view in cross-section illustrating another embodiment of this invention.

Typical of such applications is the application of this invention to structural elements such as described in U.S. Letters Patent No. 2,766,514 and depicted in FIGURES 6 and 7 of this application. Such a structural unit may be obtained by superimposing three ductile metal sheets upon each other with coextending bands of stop-weld material 14 and 15 disposed between each pair of adjacent surfaces of the sheets with the bands of stop-weld material 14 between one pair of adjacent faces disposed in staggered and overlapping relationship with the bands of stop-weld material 15 disposed between the succeeding pair of adjacent sheets. Upon pressure welding, in accordance with this said U.S. Letters Patent 2,766,514, an integrated structure 16 is obtained partially laminated internally in accordance with the bands of stop-weld material 14 and 15. Thereafter, a suitable foamable plastic forming reaction mixture is injected into the internal laminations or unwelded areas of the structural blank 16, which, upon reaction, distends the structural blank 16 into a structural element 17 having an internal hollow configuration 18, corresponding to the stop-weld bands 14 and 15, filled with a foam plastic 19. Where such elements are used for application as wall structures in buildings, the foamed material, in addition to reinforcing the element, also provides a very convenient means of insulation and sound dampening.

It is to be understood that although the invention has been described with reference to specific embodiments, materials and details, various modifications and changes, within the scope of this invention, will be apparent to one skilled in the art, and are contemplated to be embraced within the invention.

What is claimed is:

1. A method of making a composite structure comprising providing a sheet of ductile metal having parallel upper and lower surfaces and an unjoined interior portion contained within said sheet with said unjoined portion being defined between complementary portions of said sheet coextending parallel to said surfaces, injecting into interior portion a foamable plastic forming reaction mixture which forms a solid foamed plastic with said mixture being injected in an amount sufficient to deform said complementary portions away from each other in a spaced first amount, said mixture being further provided in a quantity generating sufficient foamed plastic product to additionally deform said complementary portions further away from each other into a second spaced relationship, and reacting said mixture to form said foamed plastic product and to deform said complementary portions into said second spaced relationship.

2. The method of claim 1 wherein said mixture comprises a polyurethane foamed plastic forming mixture.

3. A method of making a composite structure comprising providing a sheet of ductile metal having parallel upper and lower surfaces and an unjoined interior portion contained within said sheet with said unjoined portion being defined between complementary portions of said sheet coextending parallel to said surfaces, said complementary portions being spaced apart from each other a first amount, injecting into said interior portion a foamable plastic forming reaction material which forms a solid foamed plastic with said mixture being provided in a quantity generating sufficient foamed plastic product to deform said complementary portions further away from each other into a second spaced relationship, and reacting said mixture to form said foamed plastic product and to deform said complementary portions into said second spaced relationship.

4. The method of claim 3 wherein said mixture comprises a polyurethane foamed plastic system.

5. A method for making a composite structure comprising forming an assembly of superimposed ductile metal sheets having interposed between adjacent sheets a pattern of stop-weld material corresponding to a desired unjoined interior portion adapted to contain a fluid under pressure, pressure welding the sheets of said assembly together in their adjacent areas not separated by said material to form said unjoined interior portion, injecting into said interior portion a foamable plastic forming reaction mixture which forms a solid foamed plastic with said mixture being injected in an amount sufficient to separate the external sheets of the pressure welded assembly opposite said material away from each other in a spaced first amount, said mixture being further provided in a quantity generating sufficient foamed plastic product to separate said external sheets an additional amount further away from each other into a second spaced relationship, and reacting said mixture to form said foamed plastic product and to separate said external sheets said additional amount into said second spaced relationship.

6. The method of claim 5 wherein said mixture comprises a polyurethane foamed plastic system.

7. A method of making a composite structure comprising forming an assembly of superimposed ductile metal sheets having interposed between adjacent sheets a pattern of stop-weld material corresponding to a desired unjoined interior portion adapted to contain a fluid under pressure, pressure welding the sheets of said assembly together in their adjacent areas not separated by said material to form said unjoined interior portion, separating the external sheets of the pressure welded assembly opposite said material away from each other in a spaced first amount to form a transitory chamber between said external sheets, injecting into said chamber a foamable plastic forming reaction mixture which forms a solid foamed plastic with said mixture being injected in an amount sufficient to separate the external sheets of the pressure welded assembly opposite said material away from each other in a spaced first amount, said mixture being provided in an amount generating sufficient foamed plastic product to separate said external sheets an additional amount further away from each other into a second spaced relationship, and reacting said mixture to form said foamed plastic product and to separate said external sheets said additional amount into said second spaced relationship.

8. The method of claim 7 wherein said mixture comprises a polyurethane foamed plastic system.

References Cited by the Examiner

UNITED STATES PATENTS

| | | | |
|---|---|---|---|
| 2,690,002 | 9/54 | Grenell | 29—157.3 |
| 2,744,042 | 5/56 | Pace | 18—59 |
| 2,761,536 | 9/56 | Bradley | 29—421 |
| 2,766,514 | 10/56 | Adams | 29—421 |
| 2,806,812 | 9/57 | Merz | 29—455 |
| 2,857,660 | 10/58 | Staples | 29—157.3 |
| 2,866,774 | 12/58 | Price | 260—77.5 |
| 3,045,330 | 7/62 | Johnson et al. | 29—157.3 |

WHITMORE A. WILTZ, *Primary Examiner.*

THOMAS H. EAGER, *Examiner.*